Figure 1:
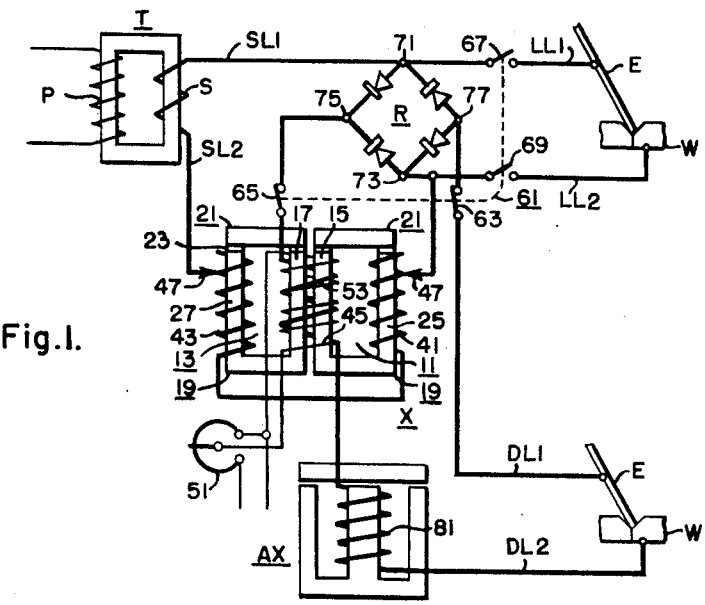

Oct. 18, 1960     L. F. PETTIT, JR     2,957,086
ARC WELDING APPARATUS
Filed Aug. 21, 1957

WITNESSES
Edwin E. Bassler
Leon M. Garman

INVENTOR
Lewis F. Pettit, Jr.
BY
Hymen Diamond.
ATTORNEY

United States Patent Office 2,957,086
Patented Oct. 18, 1960

2,957,086

ARC WELDING APPARATUS

Lewis F. Pettit, Jr., Kenmore, N.Y., assignor to Westinghouse Electric Corporation, Pittsburgh, Pa., a corporation of Pennsylvania Filed Aug. 21, 1957, Ser. No. 679,436

9 Claims. (Cl. 307—38)

This invention relates to the art of arc welding and has particular relation to the control of the welding current.

The prior art teaching is typified by Oestreicher Patent 2,535,154 which discloses arc-welding apparatus in which the control of the welding current is effected by a three-legged saturable reactor having an air gap in its center leg. This reactor has a load winding on its center leg and control windings on its outer legs. The load winding is connected in series with the supply, the welding electrode and the work and its impedance is varied by varying the saturation of the reactor. For the latter purpose the control windings are supplied with selectively variable direct current.

It has been found that the response of the Oestreicher apparatus to changes in the controlling direct current is sluggish and difficulty is encountered by the operator in setting the welding current as the weld progresses. Difficulty is also encountered in controlling the tapering off of the welding current at the end of a weld in situations in which the crater at the end of a weld is to be suppressed by such tapering off.

It is then an object of this invention to provide arc-welding apparatus in which the control is effected by varying the saturation of a reactor which shall respond in a relatively short time to variations of the direct current supplied to the controlling windings of the reactor.

Another object of this invention is to provide such arc-welding apparatus particularly suitable for effecting crater elimination by tapering off the welding current in a selectively predetermined interval.

An incidental object of this invention is to provide arc welding apparatus in which the welding current is controlled by a saturable reactor and in the use of which the presence of excessively high dangerous potentials on the current controlling mechanism handled by the operator shall be avoided.

It is desirable that apparatus of the type with which this invention is concerned shall be suitable both for direct-current and for alternating-current welding. It has been found in the use of prior art direct-current welding apparatus in which the magnitude of the welding current is controlled by a saturable reactor that an excessive number of arc outages or arc interruptions occur, and it is an incidental object of this invention to provide such direct-current arc-welding apparatus which shall operate continuously without any appreciable number of arc interruptions.

Another incidental object of this invention is to provide welding apparatus which shall serve both for alternating-current and direct-current welding and which shall operate either with direct current or with alternating current without excessive arc interruption.

In accordance with this invention, arc-welding apparatus is provided which includes a reactor having in effect or actually a three-legged saturable core which has air gaps in the magnetic paths between the center leg and each of the outer legs. The load windings of this reactor are wound on the outer legs and the control winding on the center leg. Selectively variable direct current is supplied to the control winding. It has been found that in arc-welding apparatus of this type the response of the welding current to changes in the controlling direct current is prompt. In the use of this apparatus the operator has no difficulty in coordinating the setting of the controlling direct current with the welding process. In addition, this apparatus permits the setting of the tapering off of the welding current at the end of a weld so that effective crater elimination may be achieved.

This invention in one of its specific aspects arises from the realization that in the Oestreicher apparatus the alternating current which flows in the load winding on the center air-gapped leg produces alternating-current flux in the core. This flux flows through the outer legs and induces a relatively high voltage per turn in the control windings. Since the control winding consists of a large number of turns, the induced voltage between the direct-current terminals connected to the manually actuable controlling mechanism may be dangerously high. This introduces additional complications in interconnecting the two windings to reduce the high voltage.

In the apparatus in accordance with this invention, the load windings which conduct alternating current are on the outer legs and alternating current is supplied to these control windings in series so that the flux produced by one of these windings is at any instant opposite to the flux produced by the other winding. In accordance with a specific aspect of this invention, the windings are balanced so that each transmits the same number of ampere turns. Thus the flux produced by one of the windings at any instant counteracts the flux produced by the other winding and the flux in the center leg produced by the alternating current through the load windings is substantially zero. The alternating-current potential which then appears across the terminals of the control winding is then substantially zero.

This invention in accordance with another of its aspects arises from the discovery that in direct-current arc welders of the prior art in which the welding current is controlled by a saturable reactor, the load rectifier through which the welding direct current is derived has a tendency to absorb a substantial portion of the impressed voltage. Since the impedance of the reactor if substantial also absorbs a large proportion of the voltage particularly at high currents, the voltage may be so reduced by the combined action of the rectifier and the reactor as to be inadequate to maintain the arc. In accordance with a specific aspect of this invention, this tendency of the reactor and the rectifier to reduce the arc voltage to an inadequate magnitude is suppressed by providing a feedback winding on the reactor which reduces the reactance as the welding current increases. In the preferred practice of this invention only a few feedback turns may be provided so that the reactance remains unaffected by the feedback winding at low arc currents but is materially reduced at high arc currents.

In accordance with this invention in its specific aspects, a combined alternating-current-direct-current welder including a reactor as described above is provided. The power for welding is in both situations derived from a single-phase supply through a transformer. The welder includes connections in the form of jumpers or switches for selectively connecting the load windings of the reactor and the secondary of the supply transformer either directly or through a rectifier and the feedback winding in series with the electrode and the work. In the former situation, alternating current is conducted through the arc between the electrode and the work; in the latter, direct current is conducted through the feedback winding, smoothing reactor, the electrode and the work. In each case the saturation of the reactor is controlled by the control windings which are supplied with selectively variable direct current. It has been found in arriving at this invention that both in welding with alternating current and in welding with direct current the magnitude of the current changes relatively quickly as the controlling direct current is changed. By varying the direct current with a suitably tapered variable resistor, linear control of the welding current as a function of the displacement of the resistor knob may be achieved. Comparison of the Oestreicher and similar apparatus with apparatus according to the invention reveals that in the Oestreicher and like apparatus there is a delay of about several seconds between a change in the setting of the controlling direct current and the resulting change in the welding current while in apparatus in accordance with this invention this delay is reduced to the order of about one second. In situations in which a predetermined tapering off of the welding current is desired, the apparatus in accordance with this invention may be modified so that the direct current controlling the reactor tapers off in the desired manner. For example, the control knob of a resistor controlling the direct current may be mechanically moved at a predetermined rate to produce the desired tapering or the direct current may be controlled through the discharge devices or timing networks or timing clocks to produce the desired tapering off of the welding current.

Figure 2:
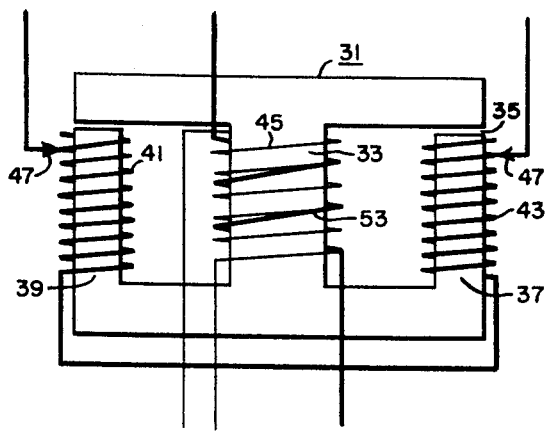

The novel features considered characteristic of this invention are disclosed generally above. The invention both as to its organization and its method of operation, together with additional objects and advantages thereof, will be understood from the following description of specific embodiments when read in connection with the accompanying drawing in which:

Figure 1 is a circuit diagram showing a preferred embodiment of this invention; and Fig. 2 is a fragmental circuit diagram illustrating a modification of this invention.

The apparatus shown in the drawing includes a supply transformer T, the primary P of which may be connected to a commercial power supply of 230 or 460 volts through the usual circuit breakers or disconnects (not shown). The secondary S of this transformer is connected to supply conductors SL1 and SL2. The apparatus also includes the load conductors LL1 and LL2 of an alternating-current welder and the load conductors DL1 and DL2 of a direct-current welder. Load conductors LL1 and DL1 respectively may be connected to the electrode E and load conductors LL2 and DL2 are shown as connected to the work W but in the usual practice of this invention are ground connections.

The apparatus in accordance with this invention also includes a controlling reactor X having a core which in effect has a center leg and two outside legs. Each of the paths including the center leg and an outside leg has an air gap.

Preferably the core of this reactor X may be composed of two window type cores 11 and 13 mounted with one of the legs 15 of each adjoining a corresponding leg 17 of the other. In a typical situation each core 11 and 13 is made up of a stack 19 of U-shaped punchings the legs of which are bridged by a stack 21 of rectangular punchings. Between the stacks 21 and the legs of the stacks 19 there are non-magnetic spacers 23 which provide the air gaps. A composite core of the three-legged type is thus provided, the center leg being made up of the adjoining legs 15 and 17 of the window cores 11 and 13 and the outer legs 25 and 27 being the remaining legs of the window cores. From the standpoint of ease and economy in manufacture the air gaps are distributed between the center leg 15—17 and the outer legs 25 and 27. The core used in the practice of this invention could also be of the type shown in Fig. 2. This core 31 has a continuous center leg 33 and air gaps 35 in the outer legs 37 and 39 only.

The reactor X has load windings 41 and 43 wound on the outer legs 25 and 27 and a control winding 45 wound on the center leg 15—17 (or 33). Each of the load windings 41 and 43 includes a tap selector 47 for varying the total number of turns of the outer legs 25 and 27 (or 37 and 39). Thus coarse variation of the welding current may be effected. It is desirable that the tap selectors 47 be adjustable together because the windings 41 and 43 on the outer legs 25 and 27 (37 and 39) should be balanced in each setting so that the flux induced in the center leg 15—17 (or 33) is a minimum. In situations as shown in Fig. 1 in which there is a gap in the center leg 15—17 of the core, the gaps in each of the branches 15 and 17 of this leg which forms the core should be substantially equal to suppress inequality of the effect of the flow of alternating current through the load windings 41 and 43.

The control winding 45 is adapted to be supplied with current from a direct-current supply. The potential impressed across the winding 45 may be varied by a variable resistor 51. By varying this potential the saturation of the core of the reactor X may be varied and this varies the impedance of the load windings 41 and 43.

The reactor X also includes a feedback winding 53 on the center leg 15—17 (33). This winding 53 may have only a few turns.

The apparatus further includes a reactor AX. This reactor is the same as the corresponding reactor disclosed in Patent 2,825,004 granted February 25, 1958, to Martin Rebuffoni and Lewis F. Pettit, Jr., for Arc Welding Apparatus.

The apparatus also includes a switch mechanism 61 having a plurality of contacts 63, 65, 67, 69 for setting the apparatus either for direct-current welding or for alternating-current welding.

In addition, the apparatus includes a rectifier R of the bridge type having input terminals 71 and 73 and output terminals 75 and 77. With alternating current impressed on the input terminals 71 and 73, full-wave direct current is derivable from the output terminals 75 and 77.

The load windings 41 and 43 of the reactor X are connected in series and the supply conductor SL2 is connected to the remaining terminal of one of the load windings 43. When the apparatus is set for alternating-current welding, the conductor SL1 is connected to conductor LL1 through the contact 67 of the switch 61 and conductor LL2 is connected to the remaining terminal of the load winding 41 through another contact 69 of the switch. The remaining contacts 63 and 65 of the switch 61 in the direct-current welding circuit are open.

When the apparatus is set for direct-current welding, conductor SL1 is connected to one of the input terminals 71 of the rectifier R and a terminal of the load winding 41 is connected to the other input terminal 73. One output terminal 75 of the rectifier R is connected to one terminal of the feedback winding 53 through one of the contacts 65. The feedback winding is in turn connected to conductor DL2 through the winding 81 of reactor AX. Conductor DL1 is connected to the output terminal 77 of rectifier R through the remaining contact 63 of the switch 61. The contacts 67 and 69 of the switch connected to conductors LL1 and LL2 are open.

In the use of the apparatus for alternating-current welding the switch 61 is set with its contacts 67 and 69 in the alternating-current circuit closed. The magnitude of the arc current may be coarsely preset by selecting a predetermined number of turns of each of the load windings 41 and 43. Fine adjustment may be effected by the variable resistor 51 in circuit with the control winding 45 of the reactor X. Once an arc is struck between the electrode E and the work W, the welding current may be varied by varying the setting of the resistor 51.

As the setting of the resistor is varied, the welding current promptly follows the variation.

When the apparatus is used for direct-current welding the reactor X and the resistor 51 are similarly set and the switch 61 is closed so that the contacts 63 and 65 in the direct-current circuit are closed and the other contacts 67 and 69 open. In this case once an arc is fired the magnitude of the arc current may be varied by the variable resistor 51. When the arc current is low the feedback winding 53 has substantially no effect and the impedance of the reactor X is determined largely by the current flow through the control winding 45. When the welding current is high, the current supplied through the feedback winding 53 materially reduces the impedance of the reactor X and thus assures that the arc will be maintained in spite of any drop through the rectifier R.

In both direct-current and in alternating-current welding the alternating current flowing through the load windings 41 and 43 does not introduce any substantial alternating potential across the control winding 45. Thus there is no danger to the operator who is welding with the apparatus.

While preferred embodiments of this invention have been disclosed herein, many modifications thereof are feasible. The invention, therefore, is not to be restricted except insofar as is necessitated by the spirit of the prior art.

I claim as my invention:

1. Arc-welding apparatus comprising supply conductors for supplying alternating current, load conductors between which a welding arc is to be produced, a saturable reactor having a core having a center leg and outer legs, said outer legs each having an air gap, said saturable reactor having a control winding on said center leg and load windings on said outer legs, means connecting in a series circuit said supply conductors, said load conductors and said load windings, said load windings being connected in voltage absorbing relationship in said last-named circuit so as to absorb the excess of voltage supplied by said source as said arc fluctuates between open circuit and short circuit conditions, and means connected to said control winding for supplying selectively variable direct current thereto.

2. Arc-welding apparatus comprising supply conductors for supplying alternating current, load conductors between which a welding arc is to be produced, a saturable reactor having a core having a center leg and outer legs, said outer legs each having an air gap and said center leg being continuous, said reactor also having a control winding on said center leg and load windings on said outer legs, means connecting in a series circuit said supply conductor, said load conductors and said load windings, said load windings being connected in voltage absorbing relationship in said last-named circuit so as to absorb the excess of voltage supplied by said source as said arc fluctuates between open circuit and short circuit conditions, and means connected to said control winding for supplying selectively variable direct current thereto.

3. Arc-welding apparatus comprising supply conductors for supplying alternating current, load conductors between which a welding arc is to be produced, a saturable reactor having a core having a center leg and outer legs, said outer legs each having an air gap, said reactor also having a control winding on said center leg and load windings on said outer legs, means connecting in a series circuit said supply conductors, said load conductors and said load windings, said load windings being connected in voltage absorbing relationship in said last-named circuit so as to absorb the excess of voltage supplied by said source as said arc fluctuates between open circuit and short circuit conditions, and means connected to said control winding for supplying selectively variable direct current thereto, said load windings being substantially balanced and being so wound that the flow of alternating flux through said center leg is substantially suppressed.

4. Arc-welding apparatus comprising supply conductors for supplying alternating current, load conductors between which a welding arc is to be produced, rectifier means, a saturable reactor having a core having a center leg and outer legs, said outer legs each having an air gap, said reactor having a control winding on said center leg, a feedback winding on said center leg and load windings on said outer legs, means connecting in a series circuit said supply conductors, said rectifier means, said feedback winding, said load conductors and said load windings, with said feedback winding and said load conductors connected to conduct direct current and said supply conductors and said load windings connected to conduct alternating current, said load windings being connected in voltage absorbing relationship in said last-named circuit so as to absorb the excess of voltage supplied by said source as said arc fluctuates between open circuit and short circuit conditions, and means connected to said control winding for supplying selectively variable direct current thereto.

5. Arc-welding apparatus comprising alternating-current supply conductors, full-wave rectifier means having input terminals between which alternating current is impressed and output terminals between which direct current is derived, load conductors between which a welding arc is to be produced, a saturable reactor having a core having a center leg and outer legs and having a control winding on said center leg, a feedback winding on said center leg, and load windings on each of said outer legs, means connecting in a first series circuit said supply conductors, said input terminals and said load windings, said load windings being connected in voltage absorbing relationship in said last-named circuit so as to absorb the excess of voltage supplied by said source as said arc fluctuates between open circuit and short circuit conditions, means connecting in a second series circuit said output terminals, said load conductors and said feedback windings, and means for supplying selectively variable direct current to said control winding.

6. Arc-welding apparatus comprising alternating-current supply conductors, full-wave rectifier means having input terminals between which alternating current is impressed and output terminals between which direct current is derived, load conductors between which a welding arc is to be produced, a saturable reactor having a core having a center leg and outer legs and having a control winding on said center leg, a feedback winding on said center leg, and load windings on each of said outer legs, each of said outer legs having an air gap, means connecting in a first series circuit said supply conductors, said input terminals and said load windings, said load windings being connected in voltage absorbing relationship in said last-named circuit so as to absorb the excess of voltage supplied by said source as said arc fluctuates between open circuit and short circuit conditions, means connecting in a second series circuit said output terminals, said load conductors and said feedback winding, and means for supplying selectively variable direct current to said control winding.

7. Arc-welding apparatus comprising alternating-current supply conductors, full-wave rectifier means having input terminals between which alternating current is impressed and output terminals between which direct current is derived, load conductors between which a welding arc is to be produced, a saturable reactor having a core having a center leg and outer legs and having a control winding on said center leg, a feedback winding on said center leg, and load windings on each of said outer legs, a smoothing reactor, means connecting in a first series circuit said supply conductors, said input terminals and said load windings, said load windings being connected in voltage absorbing relationship in said last-named circuit so as to absorb the excess of voltage supplied by said source as said arc fluctuates between open circuit and short circuit conditions, means connecting in a second series circuit said output terminals, said load conductors, said smoothing reactor and said feedback winding, and means for supplying selectively variable direct current to said control winding.

8. Arc-welding apparatus comprising supply conductors for supplying alternating current, load conductors between which a welding arc is to be produced, a saturable reactor having a core having outer legs and a center leg, there being air gaps of substantially equal length in the respective flux paths including said center leg and each of said outer legs, a control winding on said center leg, load windings on said outer legs, means connecting in a series circuit said supply conductors, said load conductors and said load windings, said load windings being connected in voltage absorbing relationship in said last-named circuit so as to absorb the excess of voltage supplied by said source as said arc fluctuates between open circuit and short circuit conditions, and means for supplying selectively variable direct current to said control winding, said load windings being balanced and so wound so as to suppress the inducing of alternating current in said control winding.

9. Arc-welding apparatus comprising alternating-current supply conductors, full-wave rectifier means having input terminals between which alternating current is impressed and output terminals between which direct current is derived, load conductors between which a welding arc is to be produced, a saturable reactor having a core having a center leg and outer legs and having a control winding on said center leg, a feedback winding on said center leg, and load windings on each of said outer legs, means connecting in a first series circuit said supply conductors, said input terminals and said load windings, said load windings being connected in voltage absorbing relationship in said last-named circuit so as to absorb the excess of voltage supplied by said source as said arc fluctuates between open circuit and short circuit conditions, means connecting in a second series circuit said output terminals, said load conductors and said feedback windings, means for supplying selectively variable direct current to said control winding, means connecting in a third series circuit said load conductors, said supply conductors, and said load windings, and means connected to said second and third circuits for selectively closing said third circuit and opening said second circuit or closing said second circuit and opening said third circuit.

References Cited in the file of this patent
UNITED STATES PATENTS

| | | |
|---|---|---|
| 1,227,302 | Osnos | May 22, 1917 |
| 1,612,084 | Weed | June 2, 1926 |
| 1,865,562 | Gilson | July 5, 1932 |
| 2,634,394 | Kohler | Apr. 7, 1953 |
| 2,667,616 | Lang | Jan. 26, 1954 |